United States Patent Office 3,597,373
Patented Aug. 3, 1971

3,597,373
COATING COMPOSITION OF A MIXTURE OF A VINYL CHLORIDE-ACETATE COPOLYMER WITH A MIXTURE OF ACRYLIC RESINS AND ONE-HALF SECOND CELLULOSE ACETATE BUTYRATE
Robert M. Bregoff, 10818 Kane St., Whittier, Calif. 90604, and Harvey J. Golumbic, 1517 Sunrise Lane, Fullerton, Calif. 92633
No Drawing. Continuation of application Ser. No. 654,376, July 19, 1967. This application Jan. 5, 1970, Ser. No. 502
Int. Cl. C08f 37/18; C09d 3/76; D06p 1/76
U.S. Cl. 260—17R
6 Claims

ABSTRACT OF THE DISCLOSURE

A coating composition for use on porous and nonporous substrates is composed of a vinyl chloride-acetate copolymer, acrylic resins, plasticizers, stabilizers, antioxidants and pigments or dyes in solution in a solvent. The acrylic resins are methyl methacrylate acidic copolymer of medium molecular weight and an acidic number of from 12 to 15 in about equal parts with n-butyl methacrylate. The plasticizers are polymerized castor oil and modified methyl acetyl ricinolate in a ratio of about 1.3 parts by weight to 1 part by weight of the vinyl chloride copolymer. The solvent content is varied to suit the particular method of coating. In most applications, coatings on vinyls and leather, for example, one-half second cellulose acetate butyrate is used to block plasticizer migration to the surface of the coating or film.

This is a continuation of application Ser. No. 654,376, filed July 19, 1967, now abandoned.

BACKGROUND OF THE INVENTION

This invention relates to a coating composition for use on flexible substrates of porous as well as nonporous material.

Previously, it has been the practice in the coating art to use different coatings for different substrates. For porous materials, such as leather and products of leather, it has generally been the practice to utilize water soluble finishes or water insolubles such as cellulose esters plus plasticizing and softening agents in an organic solvent. The latter type of finish is known as a lacquer finish. The water soluble finishes cannot be made entirely water insoluble after application resulting in the loss of finish upon wetting of the leather. On the other hand, the lacquer finishes tend to produce a cheapened appearance and often crack and flake. Vinyl coatings are often used on nonporous substrates but these coatings also exhibit a tendency to crack, flake and reduce flexibility of the finished product over that existing before coating. In any event, the same basic coating compositions could not be used with both porous and nonporous substrates, because the compositions used on either the one or the other were incompatible when applied to the alternate substrates.

In any coating used on a substrate where the final product is to have aesthetic as well as utilitarian purposes, it is highly desirable that the finish have what is known as a good hand. Hand is simply the aesthetic feel of a surface, and is often regarded the best when the coating approaches the product it is designed to emulate. For example, it is highly desirable to have a soft, smooth touch on certain finished leather items.

In addition, many fabricators of textiles, upholstery and related industrial products often use both porous and nonporous materials, both of which must be coated for purposes of enhancing their appearance, protection, and changing their color. It is highly desirable, then, to have a coating composition equally applicable to both porous and nonporous material and which can be applied by the same technique. Moreover, the expense of applying the coating should be at a minimum, and the coating should have the flexibility of being able to be applied by various techniques.

In addition to the application of coating when an item is being manufactured, it is often desirable to change the appearance of the product, or to repair already manufactured products; for example, changing the color of a pair of shoes, repairing damages in automotive upholstery, and enhancing the beauty of cheaper materials. Previously, there has been no commercial coating which satisfies the requirements of ready adaptability to porous as well as nonporous substrates on finished articles.

SUMMARY OF THE INVENTION

The composition of the present invention provides a coating for both porous and nonporous substrates. The composition consists of a mixture in solution of a copolymer of vinyl chloride and acetate which is dominantly vinyl chloride, acrylic resins, plasticizers, pigments or dyes, stabilizers and antioxidants.

The vinyl chloride-acetate copolymer is of solution grade in order to prevent gelling. The composition of the copolymer is chosen to obtain abrasion resistance, adhesion and flexibility of the coating. To this end, the vinyl chloride content is relatively high in order to achieve the desired abrasion resistance. On the other hand, the acetate content of the copolymer must be high enough to effect the desired adhesion of the coating on its substrate. It has been found that the ratio of vinyl chloride to acetate necessary for the coating to exhibit these characteristics is at a minimum 80 to 20 and at a maximum 90 to 10. Within this range, and in terms of abrasion resistance and flexibility, increasing amounts of acetate increases flexibility but diminishes abrasion resistance. The optimum ratio is 90 to 10 vinyl chloride to acetate because this ratio results in a film which has an excellent balance between the conflicting requirements of flexibility, adhesion and toughness.

The acrylic resins are used to promote coating or film adhesion to the substrate and to give a dry film within the range of temperatures normally experienced by the film. This range is typically from below zero degrees Fahrenheit to over 150 degrees Fahrenheit. The resins are also chosen for their compatibility with the vinyl chloride-acetate copolymer. The resins are a combination of methyl methacrylate acidic copolymer of medium molecular weight with an acidic number of twelve to fifteen and n-butyl methacrylate. The methyl methacrylate acidic copolymer promotes adhesion of the applied film or coating to the substrate and pigment wetting. This copolymer also has a relatively high softening point, approximately 132° C., and therefore does not soften upon exposure to the hot sun. The n-butyl methacrylate resin increases the adhesion of the film to the substrate and increases the film's flexibility but it has a low softening point, approximately 53° C. The use of the two resins together results in a film having a high softening point and flexibility whereas the use of either one without the other would result in the loss of one of these essential qualities.

The plasticizers are chosen for their solvating quality, low volatility, resistance to migration and good flexibility at low temperatures. The plasticizers must go into solution well to achieve a homogeneous coating composition. Once applied as a coating, the plasticizer should not evaporate in the temperatures experienced. Moreover, the plasticizers should not migrate to the surface of the coating where they would evaporate and create subsurface stiffness in the film and tackiness on the surface. Suitable plasticizers are Polycein 4 and Flexricin 61 ester (products of Baker Castor Oil). Polycein 4 is a polymerized castor oil while Flexricin 61 is a modified methyl acetyl ricinolate. Polycein 4 is a good wetting and dispersing medium for pigments and will not attack the vinyl chloride-acetate copolymer. This plasticizer also exhibits high temperature resistance and promotes flexibility at low temperatures. Flexricin 61 imparts flexibility and drape to the film at low temperatures and enhances hand and body at room temperatures. When the coating is to be applied to vinyl, a nonporous substrate, diisodecyl phthalate may be used as a plasticizer to further enhance the film's flexibility.

The stabilizers used promote can stability, that is, resistance to gelling, and impart ultraviolet resistance to the film or coating. Examples of suitable stabilizers are calcium zinc organic inhibitor, cadmium zinc organic inhibitor, sodium organo-phosphate, zinc organic inibitor and zinc epoxy organic inhibitor. The stabilizers are used in trace amounts. The antioxidants, such as propylene oxide, add life to the film and accelerate drying of the applied film.

The solvents employed are chosen with the particular application technique in mind. Aerosol and spraying film applications require considerable more solvent than rolling, brushing or knife applications. Preferably, the solvents include an antiblushing agent such as diacetone alcohol which is necessary to avoid a milky film appearance. Straight methyl ethyl ketone, for example, is likely to result in blushing. In addition, the solvents selected must have a high solvating power and uniform evaporation rates, the latter to inhibit blushing. When a film is to be applied to an existing coating containing nitrocellulose, often applied to leather, the solvent should be able to penetrate into the coating. Suitable solvents for this purpose include ethyl acetate and butyl acetate, the latter being included to inhibit the evaporation rate of the two solvents together.

Pigments are added to effect the color desired. If desired, the final appearance can be modified by flattening agents and pigment suspension agents.

One-half second cellulose acetate butyrate is used in the preferred formulation to form a film on the surface of the coating to prevent migration of the plasticizer and weakening of the bond between the coating and the substrate.

The compound of the present invention solves many of the problems faced by the prior art. It provides a coating composition for use with porous as well as nonporous substrates. This coating may be applied to substrates of vinyl, which is a nonporous material, as well as leather, which is a porous material. The resultant coating has a very desirable hand and can be applied by any number of prior art forms such as an aerosol can, rollers, baths, and the like. Moreover, the coating can be used over prior art coatings. The flexibility achieved by the coating of this invention is illustrated by the fact that it is possible to coat mixed materials such as vinyl and leather in one application of the same coating. (An example of mixed materials is in the automotive field where it is common to have upholsteries of leather bounded by a vinyl bead or welding.) Previously, it was necessary to protect one while coating the other. This is no longer necessary inasmuch as the coating can be applied to porous as well as nonporous substrates. Because it is readily applied to various substrates, the coating may be easily applied to such items as shoes, purses and the like, by the owner of the items. In addition, because of the high quality of the coating, cheaper materials may be used for the substrate while still achieving an expensive appearing finish. One of the most desirable characteristics of the instant composition is the fact that there is no residual tack on the coating surface.

It is believed that the remarkable results of the present composition are produced because the coating need not impregnate the pores of the substrate to achieve its adhesive qualities. By the same token, impregnation is possible with porous materials such as leather, but does not affect the final appearance or quality of the coating. It is believed that the one-half second cellulose acetate butyrate promotes a film on the surface of the coating which shields the interior of the coating from the drying effect of the atmosphere and allows it to retain the bond achieved upon its original application.

These and other features, aspects and advantages of the present invention will become more apparent from the following description, examples and appended claims.

DESCRIPTION OF THE PREFERRED EMBODIMENTS

Example I

The composition detailed in this example may be used to coat fabrics such as nylon and may be regarded as the basic composition which is altered to suit the various types of application techniques and substrates coated.

VINYL RESIN

Gms.
Vinyl chloride-acetate copolymer having a vinyl chloride to acetate ratio of 90 to 10 (VYNS—Union Carbide Corp.) _____ 77

ACRYLIC RESINS

Gms.
Methyl methacrylate acidic copolymer of medium molecular weight and an acidic number of 12 to 15 (Lucite 6012, E. I. du Pont) _____ 105
N-butyl methacrylate (Lucite 2044, E. I. du Pont) __ 105

PLASTICIZERS

Gms.
Polymerized castor oil (Polycein 4, Baker Castor Oil Co.) _____ 84
Modified methyl acetyl ricinolate (Flexricin 61, Baker Castor Oil Co.) _____ 14

SOLVENTS

Gms.
Methyl ethyl ketone _____ 1050
Methyl isobutyl ketone _____ 315
Diacetone alcohol _____ 51
Xylene _____ 1.3
Toluene _____ 557

STABILIZER

Gms.
Calcium zinc organic inhibitor (Ferro 1777) _____ 1.9

ANTIOXIDANT

Gms.
Propylene oxide _____ 0.6

Dyes or pigments as required to obtain the desired color are included in the mixture.

Example II

The basic composition given in Example I is altered for most fabric applications by increasing the amount of solvent to obtain higher penetrating power in the fabric and by increasing the plasticizers by about 3 percent of the total weight of the composition set forth in the example.

Example III

For applications of a coating on porous and nonporous substrates such as leather and vinyl but excluding fabrics, one-half second cellulose acetate butyrate is added. The amount added to the composition set forth in Example I is about 51 grams.

Example IV

The composition set forth in Example III is varied to suit the application of the composition on the substrate. For aerosol applications the solvent balance is altered to effect 9 to 13 percent solids. For spraying, the solid content is increased to between 13 to 20 percent solids. Brushing and rolling require an even higher percentage of from 20 to 26 percent. Knife coating requires between 25 to 35 percent by weight solids but may go as high as 50 percent by weight.

Example V

This example subsums much of the previous four examples but is included to show specifically the proportion of the ingredients as they would be used for a coating to be applied to both porous and nonporous substrates. This example also shows, in table form, the range of ingredients which may be used. The quantities given are based on parts by weight in 100 parts by weight vinyl chloride acetate. The solvents are given in Table II.

TABLE I

| Ingredient | Preferred amount | Range (minimum to maximum) |
| --- | --- | --- |
| Resins: | | |
| Vinyl chloride-acetate copolymer (VYNS) | 100 | |
| Methyl methacrylate acidic polymer of medium molecular weight and an acidic number of 12 to 15 (Lucite 6012) | 150 | 120-180 |
| N-butyl methacrylate (Lucite 2044) | 150 | 110-190 |
| One half second cellulose acetate butyrate (½ sec. CAB) | 66.5 | 50-80 |
| Plasticizers: | | |
| Polymerized castor oil (Polycein 4) | 109 } | 90-180 |
| Modified methyl acetyl ricinolate (Flexricin 61) | 18.2 } | |
| Diisodecyl phthalate (DIDP) | 12 | >14.5 |
| Other solids: | | |
| Stabilizer (Ferro 1777) | 2.5 | |
| Antioxidant (Propylene oxide) | 0.8 | |
| Pigment suspension agent (Thixotropic) | ¹ 20 | 10-20 |

¹ Grams.

Suitable solvents are listed below in Table II. The total amount of solvent used will vary with the particular application. In general, the range of solvents will be between 9 to 50 percent by weight of solids and solvent. The solvent quantities are given for a spraying application and are based on parts by weight solvent for each 100 parts of the vinyl chloride-acetate copolymer. The amount of each solvent relative to the other solvents will, in general, bear the same relationship given in the table.

TABLE II

Solvent: Amount (Parts by weight/100 parts of vinyl chloride-acetate copolymer)

| Solvent | Amount |
| --- | --- |
| Methyl ethyl ketone (MEK) | 1610 |
| Methyl isobutyl ketone (MIBK) | 313 |
| Diacetone alcohol (DAA) | 79 |
| Ethyl acetate (minimum) | 70 |
| Butyl acetate (minimum) | 10 |
| Xylene | 1.7 |
| Toluene | 725 |

As was previously mentioned, the vinyl chloride-acetate copolymer is of solution grade in order to prevent gelling. It has been found that the preferred vinyl chloride to acetate content is 90 to 10 because flexibility, adhesion and toughness of the resulting film or coating is optimized at this ratio. However, a ratio of 80 to 20 may be used to gain flexibility and adhesion at the expense of abrasion resistance. A suitable alternate solution grade vinyl chloride-acetate copolymer having an acceptable ratio is sold by Union Carbide Corporation and is identified as VYHH. This particular copolymer has vinyl chloride to acetate ratio of 87:13.

The acrylic resins, methyl methacrylate and n-butyl methacrylate promote adhesion, pigment wetting and flexibility. The amount of each used with respect to the other depends on the desired softening point and flexibility of the resulting film. In general, the resins are employed in a weight ratio of 1 to 1 to optimize these film characteristics.

The one-half second cellulose acetate butyrate blocks the plasticizers from migrating to the surface of the resulting film. The upper limit of this resin in 100 parts of the vinyl chloride acetate copolymer is about 80 parts. Above this value, the film becomes too brittle. The lower limit of 50 parts is not critical but represents a practical amount in the composition to effect plasticizer blocking.

The limits of the Polycein 4 and Flexricin 61 plasticizers reflect additional film qualities. As the content of these plasticizers increase above 180 parts by weight to 100 parts by weight of the vinyl chloride-acetate copolymer, the resulting film becomes soft and tacky as well as losing adhesion to the substrate. As the amount drops below 90 parts to 100 parts of the vinyl chloride acetate resin, the resulting film becomes too brittle.

The relative amounts of Polycein 4 and Flexricin 61 with respect to each other are variable within wide limits. In fact, one may be displaced entirely by the other. However, it is believed that the Flexricin 61 increases the film's life. The diisodecyl phthalate (DIDP) is not necessary when the base or substrate material is porous, but with nonporous substrates such as vinyl it is necessary to impart flexibility to the vinyl chloride-acetate resin and cellulose acetate butyrate. Increasing the amount of DIDP above 14.5 parts to 100 parts of the vinyl copolymer (0.145 parts DIDP for each part vinyl copolymer) results in excessive softening and loss of adhesion.

The stabilizers, antioxidants and pigment suspension agents have been previously discussed. The only consideration of note is that with the thixotropic suspension agent in aerosol applications an excess of the 22 parts per 100 parts of the vinyl copolymer may cause film swelling. Below the limit of 10 parts, the suspension agent loses its effectiveness.

The solvents are chosen for their combined solvating power and evaporation rates. It is desirable to have uniform evaporation rates to inhibit blushing. This is the reason for the diacetone alcohol. Solvent selection was previously discussed and, therefore, will not be further elaborated on here.

The present invention has been described with reference to certain preferred embodiments by way of example. It should be understood by those skilled in the art, however, that the spirit and scope of the appended claims should not necessarily be limited to this description.

What is claimed is:

1. A coating composition in parts by weight solids for each part by weight of a copolymer of vinyl chloride and vinyl acetate comprising:
   (a) one part of a copolymer of vinyl chloride and vinyl acetate having a vinyl chloride to acetate ratio of from between about 80:20 and about 90:10;
   (b) from between about 2.3 to about 3.7 parts of a mixture of acrylic resins consisting of:
      (i) from between about 1.2 to about 1.8 parts by weight of a methyl methacrylate resin of medium molecular weight and having an acidic number of from between about 12 to about 15, and
      (ii) from between about 1.1 to about 1.9 parts of a n-butyl methacrylate resin;
   (c) from between about 0.5 to about 0.8 part one-half second cellulose acetate butyrate;
   (d) from between about 0.9 to about 1.8 parts of plasticizer selected from the group consisting of polymerized castor oil and modified methyl acetyl ricinolate; and
   (e) minor amounts of pigments or dyes, stabilizers and antioxidants;
the solids being in solution in a solvent with the total weight of solids of from between about 9 to about 50 percent by weight of the solids and solvent.

2. The coating composition claimed in claim 1 including as an additional plasticizer up to 0.145 part of diisodecyl phthalate and a small amount of a thioxtropic pigment suspension agent.

3. The coating composition claimed in claim 1 wherein the copolymer of vinyl chloride-acetate has a vinyl chloride to acetate ratio of about 90:10.

4. The coating composition claimed in claim 3 including as an additional plasticizer up to 0.145 part of diisodecyl phthalate.

5. The coating composition claimed in claim 4 wherein the solvent includes an antiblushing agent.

6. A coating composition in parts by weight solids for each part by weight of the copolymer of vinyl chloride and vinyl acetate listed below comprising:
   (a) one part of a copolymer vinyl chloride and vinyl acetate having a vinyl chloride to acetate ratio of about 90:10;
   (b) about 1.5 parts methyl methacrylate resin of medium molecular weight and having an acidic number of 12 to 15;
   (c) about 1.5 parts n-butyl methacrylate resin;
   (d) about 0.67 part one-half second cellulose acetate butyrate;
   (e) about 1.27 parts of a plasticizer selected from the group consisting of polymerized castor oil and modified methyl acetyl ricinolate;
   (f) up to 0.145 part diisodecyl phthalate; and
   (g) minor amounts of stabilizers, antioxidants and pigment suspension agents;

the solid being in solution in a solvent with the total weight of solids of from between about 9 to about 50 percent by weight of the solids and solvent.

References Cited
UNITED STATES PATENTS

| | | | |
|---|---|---|---|
| 2,872,423 | 2/1959 | Goldstein | 260—16 |
| 2,944,037 | 7/1960 | Clark | 260—23 |
| 2,964,486 | 12/1960 | Bernier | 260—23 |
| 3,010,925 | 11/1961 | Lynn | 260—23 |

WILLIAM H. SHORT, Primary Examiner

L. M. PHYNES, Assistant Examiner

U.S. Cl. X.R.

117—138.8A, 138.8N, 139.5A, 161C; 260—23, 31.2R, 31.8M, 32.8R, 33.4R, 33.6UA, 41C, 45.7P, 45.8A

PO-1050
(5/69)

UNITED STATES PATENT OFFICE
CERTIFICATE OF CORRECTION

Patent No. 3,597,373            Dated Aug. 3, 1971

Inventor(s) Bregoff, Robert M., & Golumbic, Harvey J.

It is certified that error appears in the above-identified patent and that said Letters Patent are hereby corrected as shown below:

Column 5, about line 28 in Table I, range should read "- to 14.5" rather than "> 14.5".

Signed and sealed this 28th day of March 1972.

(SEAL)
Attest:

EDWARD M. FLETCHER, JR.           ROBERT GOTTSCHALK
Attesting Officer                   Commissioner of Patents